(12) United States Patent
Chao et al.

(10) Patent No.: US 6,415,069 B1
(45) Date of Patent: Jul. 2, 2002

(54) OPTICAL SWITCHING MODULES AND SYSTEMS

(75) Inventors: Yong-Sheng Chao, Storrs, CT (US); Ying Zhao, New York, NY (US)

(73) Assignee: Advanced Optical Technologies, Inc., E. Hartford, CT (US)

( * ) Notice: Subject to any disclaimer, the term of this patent is extended or adjusted under 35 U.S.C. 154(b) by 47 days.

(21) Appl. No.: 09/714,333

(22) Filed: Nov. 16, 2000

(51) Int. Cl.$^7$ ................................................. G02B 6/26
(52) U.S. Cl. ............................. 385/16; 385/18; 385/33; 359/813
(58) Field of Search ............................. 385/16, 18, 22, 385/33; 359/813, 824, 298, 223

(56) References Cited

U.S. PATENT DOCUMENTS

| | | | | |
|---|---|---|---|---|
| 3,624,817 | A | * 11/1971 | Lee et al. | 359/303 |
| 5,920,662 | A | * 7/1999 | Hinkov | 385/14 |
| 6,091,867 | A | 7/2000 | Young et al. | 385/17 |
| 6,204,955 | B1 * | 3/2001 | Chao et al. | 359/298 |
| 6,222,302 | B1 * | 4/2001 | Imada et al. | 310/321 |
| 6,253,001 | B1 * | 6/2001 | Hoen | 385/17 |
| 6,292,310 | B1 * | 9/2001 | Chao | 359/813 |
| 6,295,171 | B1 * | 9/2001 | Chao et al. | 359/813 |

OTHER PUBLICATIONS

L.Y. LIn et al., Free–Space Micromachined Optical Switches for Optical Networking, IEEE Journal of Selectedf topics in Quantum Electronics, vol. 5, No. 1, Jan./Feb. 1999, pp. 4–9.

Steffan Glöckner, Micro–opto–mechanical Beam Deflectors, Optical Engineering, vol. 36(5), May 1997, pp. 1339–1345.

* cited by examiner

Primary Examiner—Robet H. Kim
Assistant Examiner—Chih-Cheng Glen Kao
(74) Attorney, Agent, or Firm—Morse, Altman & Martin

(57) ABSTRACT

An optical switching system employing switching modules. Each module comprises (a) a source channel, (b) a transmitting element, (c) a receiving element, and (d) a destination channel. The transmitting element directs the source channel signal to a destination channel. The transmitting element includes an initial beam deflector and a beam deflection amplifier. The receiving element includes a beam deflection compressor and a beam aligner. One embodiment of the initial deflector is a pair of focusing lenses, one of which is displaced by a piezoelectric actuator. When one lens is displaced a distance d, the output light beam has a deflection angle $\alpha = (f_1 + f_2)/f_2$. The beam deflection amplifier multiplies the small angle $\alpha$ by a transfer function F to result in a beam with a deflection angle $F\alpha$. The receiving element is the transmitting element in reverse. The first system configuration connects a single channel to one of a number of channels. The second system configuration connects a group of M channels with another group of N channels. The third system configuration cross-connects N channels in an arbitrary manner.

8 Claims, 7 Drawing Sheets

OPTICAL SWITCHING MODULES AND SYSTEMS

BACKGROUND OF THE INVENTION

1. Field of the Invention

This invention relates generally to fiber optic communications and, more particularly, to optical switching techniques for fiber optic communications.

2. The Prior Art

The use of fiber optics to convey information is expanding at an ever-increasing rate. And speeds at which information is moving along fiber optics is also increasing. As a consequence, the need for more and faster optical switching is also increasing and is a critical technique in the continued proliferation of fiber optic communications. Currently available optical switching techniques, such as electro-optical waveguide methods, microelectromechanical (MEM) mirror methods, ink jet bulb methods, cannot meet the ever-increasing need for speed by rapidly developing optical communication networks. The most challenging requirements of an optical switch, resulting from the most recent optical network developments include the following.

(a) The switching device must have a sufficiently long service lifetime. For example, taking into account current device fabrication capabilities, the typical service lifetime of MEM devices is but a few million operations. By simply comparing the basic facts that a provisioning switch, a switch used for cross-connection and reconfiguration of different light paths in an optical network, must typically perform tens, if not hundreds, of operations per second and that there are approximately 31.5 million seconds in one year, the service life of current MEM devices means that they are clearly inadequate for use as provisioning switches. Because optical switches are constantly working with frequent operations, and the replacement of a major optical switch in the network is an expensive proposition, a service life of hundreds or thousands of times longer than current MEM devices is appropriate. In order to ensure substantially a longer service life, new materials and processes must be used.

(b) It is highly desirable that an optical switching system be scaleable and have a large potential capacity. For example, an optical switch that has N×N=32×32 ports (connecting a group of 32 optical fibers to another group of 32 optical fibers) is currently considered to be a large switch, and it is expected that N will increase rapidly in the foreseeable future. One problem with the optical switching methods of the prior art is that, in all current switch structures for connecting one group of N optic fibers to another group of N fibers, there must be N×N switching cell elements. See, L. Y. Lin et al., Free-Space Micromachined Optical Switches for Optical Networking, IEEE Journal of Selected Topics in Quantum Electronics, Vol. 5, No. 1, pg 4 (1998) and U. S. Pat. No. 6,091,867, issued to Young et al. The N×N=N$^2$ rule makes the optical switch structure at least very inefficient for moderate size switches and practically unfeasible for very large optical switches. For continued development, new switching structures must be provided.

(c) The speed of optical switch is another important performance parameter. A minimum switching speed of 10 ms is considered acceptable for a provisioning optical switch. MEM device switches have a speed of few milliseconds. However, as network speeds increase, the need for higher speed switches will become more important.

SUMMARY OF THE INVENTION

An object of the present invention is to provide an optical switch structure that can switch a single source signal to multiple destinations.

Another object is to provide an optical switch structure with microsecond response times.

Yet another object is to provide a switch structure that can be used in an optical switching system for cross-connecting multiple optical fibers using only one switch element per fiber.

A further object is to provide a switch structure that can be used in an optical switching system for cross-connecting multiple optical fibers to each other.

The present invention is an optical switching system for use in building optical switching systems that have the capability of providing optical cross-connections among a large number of optical fibers for fiber optic communications. The system employs several optical switching modules, each of which provides a connection between two optical fibers. The switching module comprises (a) a source channel, (b) a transmitting element, (c) a receiving element, and (d) a destination channel.

The source channel is the source of the signal that is being switched to an arbitrarily selected destination channel. It is a single optical fiber of a type used for fiber optic communications. A collimating lens transforms the light energy emitted from the fiber to a collimated light beam, and a connector couples the optical fiber to the collimating lens. The transmitting element includes an initial beam deflector, which produces a small change of the direction of the collimated light beam. A beam deflection amplifier amplifies the deflection of the initially-deflected light beam to produce a fully deflected light beam in the direction of the destination channel. The receiving element ensures that the light beam is correctly aligned for the destination channel. It includes a beam deflection compressor, which decreases the angle of the fully deflected light beam relative to the destination channel, and a beam aligner, which provides a fine direction change for aligning the coarsely aligned beam precisely with the destination channel. The destination channel includes a focusing lens for focusing the aligned light beam to the open end surface of the destination optical fiber.

The present invention contemplates at least four embodiments of the switching module, where the differences between embodiment lies with the transmitting and receiving elements. The first embodiment comprises a pair of focusing lenses and a piezoelectric actuator, where one of the lenses is rigidly bonded to the actuator. When the axes of the two lenses coincide with the axis of a collimated light beam, the light beam is focused at a focal point on the optical axis of the system. When the axis of one lens deviates from the light beam axis by a distance d and the lenses are a distance $s=f_1+f_2$ apart, then the light beam becomes collimated again after passing through the second lens, but with a deflection angle $\alpha=d/f_2$.

The beam deflection amplifier multiplies the small initial deflection angle α by a transfer function F to result in a beam with a full deflection angle Fα. There are four preferred configurations for the beam deflection amplifier. The first is a standard telescope lens system. The second preferred configuration is to use a compound lens system as lens $L_2$ of the initial deflector. The third preferred configuration is the lens system disclosed in the U.S. Pat. No. 6,204,955, entitled APPARATUS FOR DYNAMIC CONTROL OF LIGHT DIRECTION IN A BROAD FIELD OF VIEW. The fourth preferred configuration is the lens system disclosed in the U.S. Pat. No. 6,295,171 entitled PIEZOELECTRIC LIGHT BEAM DEFLECTOR.

In the receiving element, the beam deflection compressor has a transfer function G, where $-1<G<1$, which when applied to the output of the beam deflection compressor results in a beam with a deflection angle of $GF\alpha$. A preferred embodiment of the receiving element is simply the transmitting element used in reverse. When $G=1/F$, the light beam output from the beam deflection compressor has a deflection angle $\alpha$. Likewise, a preferred embodiment of the beam aligner is the initial beam deflector used in reverse.

The second embodiment of the switching module is the same as the first embodiment except that the positive lens $L_2$ is replaced by a negative lens $L_{2N}$. The formula for determining the deflection angle is the same as that of the first module embodiment, except that $f_2<0$.

In the third embodiment, the small deflection angle change is produced by a separate tilting mirror that is controlled by a piezoelectric actuator.

In the fourth embodiment, the initial beam deflector is another electrically-controlled beam deflector such as acousto-optical light beam deflectors, surface acousto-optical wave (SAW) deflectors, electro-optical light beam deflectors, electrically-controlled light grating deflectors, liquid crystal light beam deflectors, light grating valve devices, etc. These light beam deflectors are advantageous in many cases because they have no mechanical moving parts.

The first system configuration connects a single channel A to one of a number of B channels. The system consists of a single transmitting element and a number of receiving elements, one for each B channel. The group B channel to which the source signal is directed is determined by the deflection angle of the transmitting element. Note that, because all of the optical components of the system are bi-directional, the switch will operate in either direction.

The second switching system configuration connects a group of M channels (group A) with another group (group B) of N channels. Again, since all components are bi-directional, signals can travel in both directions. This configuration illustrates one of the main advantages of the present invention over the switching systems of the prior art: to cross-connect a group of M channels to a group of N channels, only M+N switch cells are needed, rather than the M×N switches that are needed by prior art switching systems.

The third switching system configuration can cross-connect N channels in an arbitrary manner. When the channels are positioned with a symmetric geometry, each channel can transmit and/or receive a signal from any other channel through a pair of single switch cells and a mirror. The mirrors are fixed relative to the other system components and adjusted to a specific orientation so that, when no switching signals are applied to any of the channels, each channel is statically connected to one and only one other channel. Thus, even with no switching signals present, all channels are mutually connected.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

The present invention includes an optical switching module and a system employing the optical switching module for use in building optical switching systems that have the capability of providing optical cross-connections among a large number of optical fibers for fiber optic communications.

A. The Optical Switching Module

Figure 1:
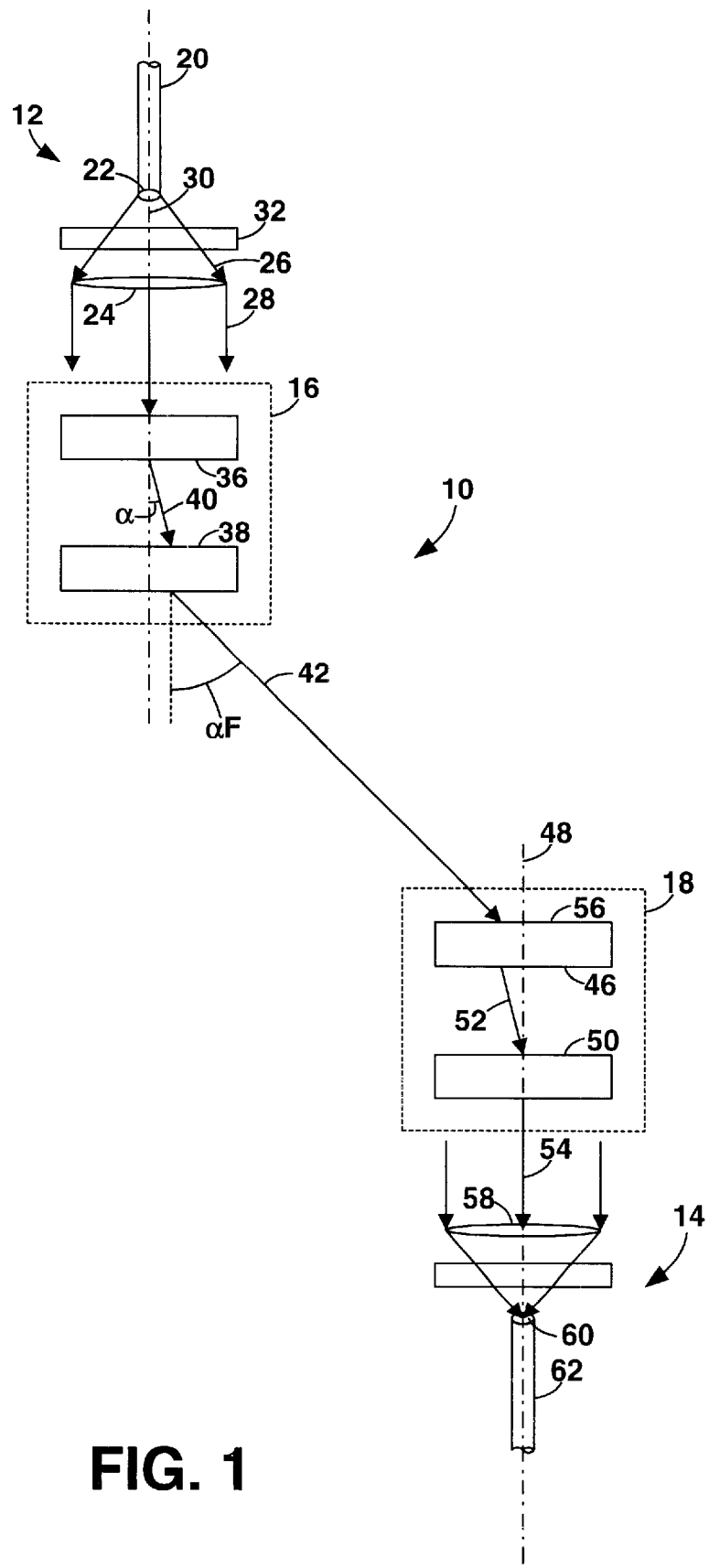
FIG. 1 shows the major components of the optical switching module of the present invention.

The optical switching module of the present invention provides a connection between two optical fibers through dynamic and quantitative control of light beam transmission in free space. As shown in FIG. 1, the switching module 10 has four basic elements: (a) the source channel 12, (b) the transmitting element 16, (c) the receiving element 18, and (d) the destination channel 14.

(a) The first element is the source channel 12. This is the source of the signal that is switched from its current path to an arbitrarily selected destination channel 14. The present invention assumes that the optical switch will be operating on the signal from a single optical fiber 20 that is emitting light energy from its open end surface 22. The light energy may be modulated to carry information for optical communications. The optical fiber 20 can be any type of the types used for fiber optic communications. It can be monomode or multimode. It can range in size from, for example, as small as 3 $\mu$m to as large as 500 $\mu$m. There is also no restriction on material or the value of the nominal aperture, which can be as small as, for example, 0.1 to as large as 1.0.

The first component is a collimating lens 24 for transforming the light energy 26 emitted from the optical fiber 20 into an essentially collimated light beam 28. The source optical fiber 20 and the collimating lens 24 have an optical axis 30. The second component is a connector 32 for coupling the optical fiber 20 to the collimating lens 24. Connectors of this sort are old and well-known in the art.

(b) The second element is the transmitting element 16, which conveys the collimated source light beam 28 from the source channel 12 through free space toward the destination channel 14. One component is an initial beam deflector 36 which produces a small change of the direction of the collimated light beam 40. The second component is a beam deflection amplifier 38, which amplifies the deflection of the initially-deflected light beam 40 to produce a fully deflected light beam 42.

(c) The third element is the receiving element 18, which ensures that the light beam is in correct alignment for the destination channel 14. The first component is a beam deflection compressor 46 which decreases the angle of the fully deflected light beam 42 relative to the optical axis 48 of the destination channel 14, outputting a coarsely aligned beam. The second component is a beam aligner 50, which provides a fine direction change for aligning the coarsely aligned beam 52 precisely with the optical axis 48 of the destination channel 14, as at 54.

(d) The final element is the destination channel 14, the channel to which the source channel 12 is switched. The first component is a focusing lens 58 for focusing the aligned light beam 54 to the second component, the open end surface 60 of the destination optical fiber 62. Focusing the light beam onto the optical fiber 62 minimizes the losses associated with misalignment.

The optical switch of the present invention is essentially different from optical switches of the prior art in three ways:

(1) A single switch element of the present invention can switch the signal from a single optical fiber to a large number of destinations through the dynamic and quantitative control of light beam direction in free space. In the switching systems of the prior art, a light switch has only two positions, an "on" state where the light is deflected at one fixed angle, and an "off" state where the light is deflected at a different fixed angle, possible not deflected from its original direction. See, Lin et al., supra. Thus, if more than two destinations are desired, the source signal must either be split and routed to a number of switches or it must be routed through a binary tree of switches. In either case, signal quality can be severely degraded, affecting the bandwidth of the system.

(2) In the present invention, the dynamic and quantitative control of the light beam direction is through a joint operation of an initial light beam deflector 36 and a beam deflection amplifier 38. The initial deflector 36 provides only a small change of the beam direction, while the beam deflection amplifier 38 multiplies the deflection angle suitable for transmitting the light beam to the desired location. The initial deflection angle is small, for example, typically in the range of 0.05° to 5°, and there are a number of new physical processes that can accomplish this. The present invention significantly extends the range and the types of physical processes that can be used for optical switching in comparison with those in the prior art.

(3) Since the light beam transits in free space, a technique to precisely aligning the beam with the destination channel 14 is needed. For this purpose, a receiving element 18 is used. The receiving element 18 comprises a beam deflection compressor 46 and a beam aligner 50. The beam deflection compressor 46 reduces the large deflection angle to a smaller value, so that the beam aligner 50 can provide a precise beam alignment through a slight adjustment of the light beam direction. For example, the light beam may be up to 80° from the optical axis 48 of the destination channel 14. The beam deflection compressor 46 reduced the angle to something in the range of 0.1° to 5°. Then the beam aligner 50 merely changes the beam direction slightly to align it with the destination channel 14. The use of the beam deflection compressor 46 significantly extends the range and the types of the physical processes that can be used in optical switching.

1. The First Module Embodiment

As discussed above, the source optic fiber 20 can be any type of optical fiber used for fiber optic communications. The light output from the fiber 20 is coupled by a connector 32 to a collimating lens 24 to transform the light energy to a collimated beam 28. This is a standard practice, and various configurations of hardware used to couple and align the fiber 20 with the collimating lens 24 are well known in the art. The diameter of the collimating lens 24 can be as small as, for example, 100 μm to as large as 10 mm.

The initial deflector 36 causes the light beam to be deflected by a small initial angle α relative to the optical axis 30 of the source channel 12. Obviously, the minimum deflection angle is 0°. A typical range for the maximum initial deflection angle α is from between 0.1° to 5°, depending upon the specific quantitative requirements of the optical switching system being implemented. Because the initial deflection angle can be small, a great variety of light deflection methods which are not available for use in the prior art becomes excellent options for use in the present invention.

In this first embodiment, the initial beam deflector 36 uses a piezoelectric actuator. A piezoelectric actuator is a device that changes a physical dimension when an electric signal is applied. They are constructed to provide a driving force to an object so that the object can change its position or change its orientation in space. The three independent position coordinate parameters and the three independent orientation coordinate parameters of the driven object can be changed either individually or in combination. The driving force is generally very strong, ranging from 0.1 to 10,000 Newtons. The size of the dimensional change is quantitatively related to the voltage of the electric signal. When a reasonably high voltage is applied to a present technology piezoelectric actuator, the displacement produced by the actuator can be in the range of between 10 μm to as large as 500 μm. The piezoelectric actuator is designed to work either in a high voltage mode (1,000 V) or a low voltage mode (100 V), either of which can provide the desired displacement. The high voltage mode has the advantage of higher speed and is suitable for working with discrete semiconductor devices such as IGBTs, etc. The low voltage mode has the advantage of being compatible with certain commercial CMOS integrated circuit devices constructed in a compact large array form.

Figure 2:
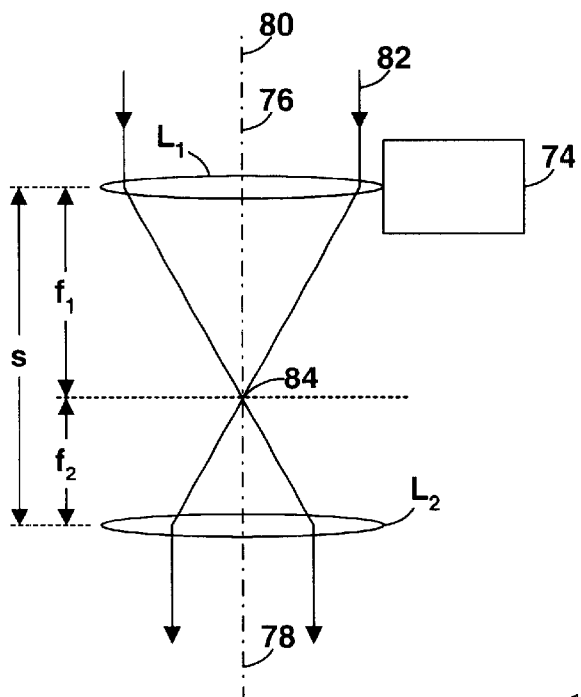
FIG. 2 shows one embodiment of the initial light beam deflector in its non-deflecting state.
Figure 3:
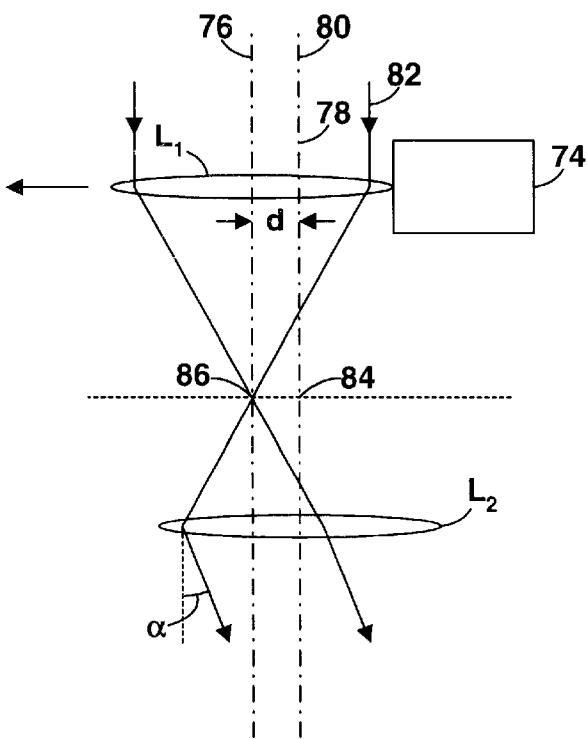
FIG. 3 shows the initial light beam deflector of FIG. 2 in its deflecting state.

The initial deflector 36, shown schematically in FIGS. 2 and 3, comprises a first focusing lens $L_1$ with a focal length $f_1$, a second focusing lens $L_2$ with a focal length $f_2$, and a piezoelectric actuator 74, where one of the lenses $L_1$ or $L_2$ is rigidly bonded to the piezoelectric actuator. When the central symmetric axes 76, 78 of the two lenses $L_1$ and $L_2$ coincide with the optical axis 80 of a collimated light beam 82, the light beam 82 is focused at a focal point 84 on the optical axis of the system. When the symmetric axis 76 of lens $L_1$ deviates slightly from the light beam axis 80 by a distance d, the position of its focal point 86 is shifted by the same distance d. If lens $L_2$ is at a distance $s=f_1+f_2$ from lens $L_1$ and its axis 78 remains coincident with the light beam axis 80, then the light beam becomes collimated again after passing through lens $L_2$, but will propagate with a deflection angle $\alpha=d/f_2$. Assuming that the focal length $f_2=2$ mm and that the displacement d of the axis 76 of lens $L_1$ from the light beam axis 80 is d=100 μm, the initial deflection angle will be $\alpha=d/f_2=100/2,000=1/20$ radians≈3°. This is but one of a range of initial deflection angle values, which can typically range up to about 5°. If the light beam axis 80 is denoted as the Z axis, the axis across the drawing sheet as the X axis, and the axis into the drawing sheet as the Y axis, then a piezoelectric actuator 74 can move lens $L_1$ two-dimensionally in the XY plane by an appropriate amount x,y.

This will correspond to a light beam deflection angle of α in the XZ plane and a light beam deflection angle of β in the YZ plane.

Note that piezoelectric actuators are usually categorized as electromechanical devices. However, in the present invention, piezoelectric actuators can be designed such that they differ significantly from other conventional electromechanical devices. First, the piezoelectric actuators to be used in the present application can be made extraordinarily robust so that they have an extraordinarily long service life, to the point where it can be presumed that they will outlast the usable life of the switching system of which it is a part. The reason is that when the lens and actuator are rigidly bonded together, the actuator-lens system actually becomes a single object. When the electrical signal is applied or the signal amplitude is changed, a displacement of the lens-actuator object is produced without producing mechanical friction in the entire system. This is a significant difference between conventional electromechanical light beam deflectors and piezoelectric actuators. According to experimental data, the service lifetime of presently available piezoelectric actuators can be billions of operations.

(2) The piezoelectric actuators to be used in the present application can be made with very fast response times. According to experimental data, as long as the size of the actuator is sufficiently small, the response time can be measured in microseconds.

The beam deflection amplifier 38 multiplies the small initial deflection angle α by a transfer function F to result in a full deflection angle Fα. Typically F will be constant for all values of α. However, the present invention contemplates that F may vary depending upon where on the initially deflected beam impinges the beam deflection amplifier 38. In other words, F may have a spatial variation F(x,y), where (x,y) represents the location of the initially deflected beam on the beam deflection amplifier 38.

In this first embodiment of the present invention, there are four preferred configurations for the beam deflection amplifier 38. The first preferred configuration is to use standard telescope lens system. A standard telescope lens system comprises two lenses with different focal length. One lens is objective and another is the eyepiece. The amplification is basically determined by the ratio of the focal length of the two lenses, as described in great detail in optics textbooks.

The second preferred configuration is to use a compound lens system as lens $L_2$ of the initial deflector 36. Using compound lens systems for reducing aberration and improving the field of view of a telescope is standard in telescope systems. The same procedures can be utilized in this first embodiment for improving the maximum output deflection angle. A number of such lens structures are available, for example, the Erfle eyepiece, the RKE eyepiece, etc. These lens systems with a compound focusing lens structure can improve the maximum output deflection angle to some extent.

The third preferred configuration is the lens system as disclosed in the U.S. Pat. No. 6,204,955, entitled APPARATUS FOR DYNAMIC CONTROL OF LIGHT DIRECTION IN A BROAD FIELD OF VIEW, incorporated herein by reference. Although a standard telescope lens system can amplify the deflection angle of a collimated light beam, the maximum deflection is very limited, typically the range of 5° to 20°, depending on output beam quality. The beam quality requirements generally include a combination of parameters such as beam divergence, chromatic aberrations, wavefront distortions, and geometric distortions. When the requirements are strict, standard telescope lens system can practically only provide a maximum deflection of only 10° to 15°. The lens system disclosed in the U.S. Pat. No. 6,204,955 can provide an output deflection angle that approaches ±90°.

The fourth preferred configuration is the lens system disclosed in the U.S. Pat. No. 6,295,171 entitled PIEZOELECTRIC LIGHT BEAM DEFLECTOR, incorporated herein by reference. This application describes deflectors with approximately the same performance as those in disclosed in the U.S. Pat. No. 6,204,955 with further improvement in system structure.

As to the receiving element 18, when the light beam arrives at the location of the axis 48 of the destination optical fiber 60, it must be precisely aligned with the optical fiber axis 48. As described above, the receiving element 18 includes a beam deflection compressor 46 and a beam aligner 50. The beam deflection compressor 46 has a transfer function G, where −1<G<1. Thus, the output of the beam deflection compressor 46 is the input Fα multiplied by the transfer function G, or GFα.

A preferred embodiment of the receiving element 18 is simply the transmitting element 16 arranged in reverse. As described above, beam deflection amplifier 38 multiples the deflection angle of an input light beam by a function F with F>1. When used in reverse, the deflection angle of a beam incident on the "output" side is multiplied by the function G. In some cases, G=1/F, but this is not a requirement of the present invention, particularly when the axes of the source and destination channels are not parallel. When G=1/F, one embodiment of the beam deflection compressor 46 is the beam deflection amplifier 38 in reverse. This means that the light beam output from the beam deflection compressor 46 has a deflection angle GFα=(1/F)Fα=α from the optical axis 48 of the destination channel 14.

Likewise, one embodiment of the beam aligner 50 is the initial beam deflector 36 used in reverse. For example, using a beam aligner of the same construction as the above example for the initial beam deflector 36, when the actuator moves the lens by a distance d=50 μm, the light beam will be deflected by an angle of approximately 1.5°.

Note that, because the receiving element 18 can be the same as the transmitting element 16 merely used in reverse, the switching module will operate bidirectionally. In the remainder of the present specification, the term "switch cell" refers to either a transmitting element 16 or receiving element 18.

Note that there may be any number of trivial variations of the first embodiment. The first variation is to use an actuator to move the fiber and collimating lens assembly away from the optical axis, rather than moving one of the lenses.

Figure 4:
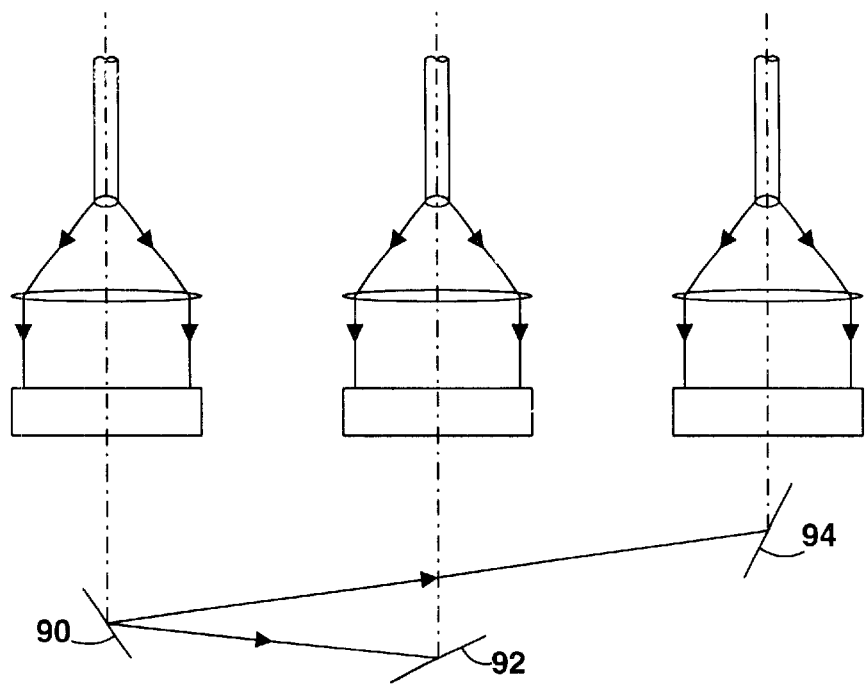
FIG. 4 shows the use of mirrors to change the light path.
Figure 5:
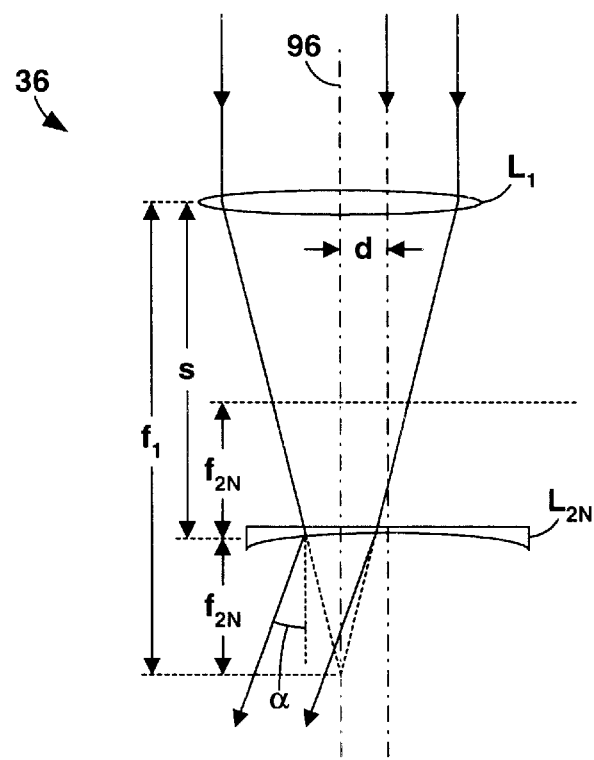
FIG. 5 shows the another embodiment of the initial light beam deflector in its deflecting state.

The second variation is to insert fixed mirrors 90, 92, 94 in the light path to change the light propagation direction by a fixed amount, as in FIG. 4. In this way, the output from a number of optical fibers can be directed to essentially the same area of space. In some applications, such a configuration may be beneficial for switching geometry.

Generally, in an optical system designed for executing a specific function, a number of accessory optical components can be inserted without changing the basic function of the system. These accessories can include, for example, mirrors, prisms, beam splitters, field lenses, coatings, etc. The use of any accessory components for appropriate enhancement of system performance is contemplated by the present invention.

2. The Second Module Embodiment

The second embodiment of the initial deflection assembly is essentially the same as the first embodiment except that the positive lens $L_2$ is replaced by a negative lens $L_{2N}$. The distance s between lens $L_1$ and lens $L_{2N}$ is such that $s=f_1+f_2$. Since $f_1>0$ and $f_2<0$, then $s=f_1-|f_2|<f_1$.

The process and analysis and formulas for the deflection angle are exactly the same as those described in the first module embodiment, except that $f_2<0$. As a result, when lens $L_{2N}$ is displaced by a small distance d from the optical axis 90, the initial deflection angle is angle $\alpha=x/f_2$.

3. The Third Module Embodiment

Figure 6:
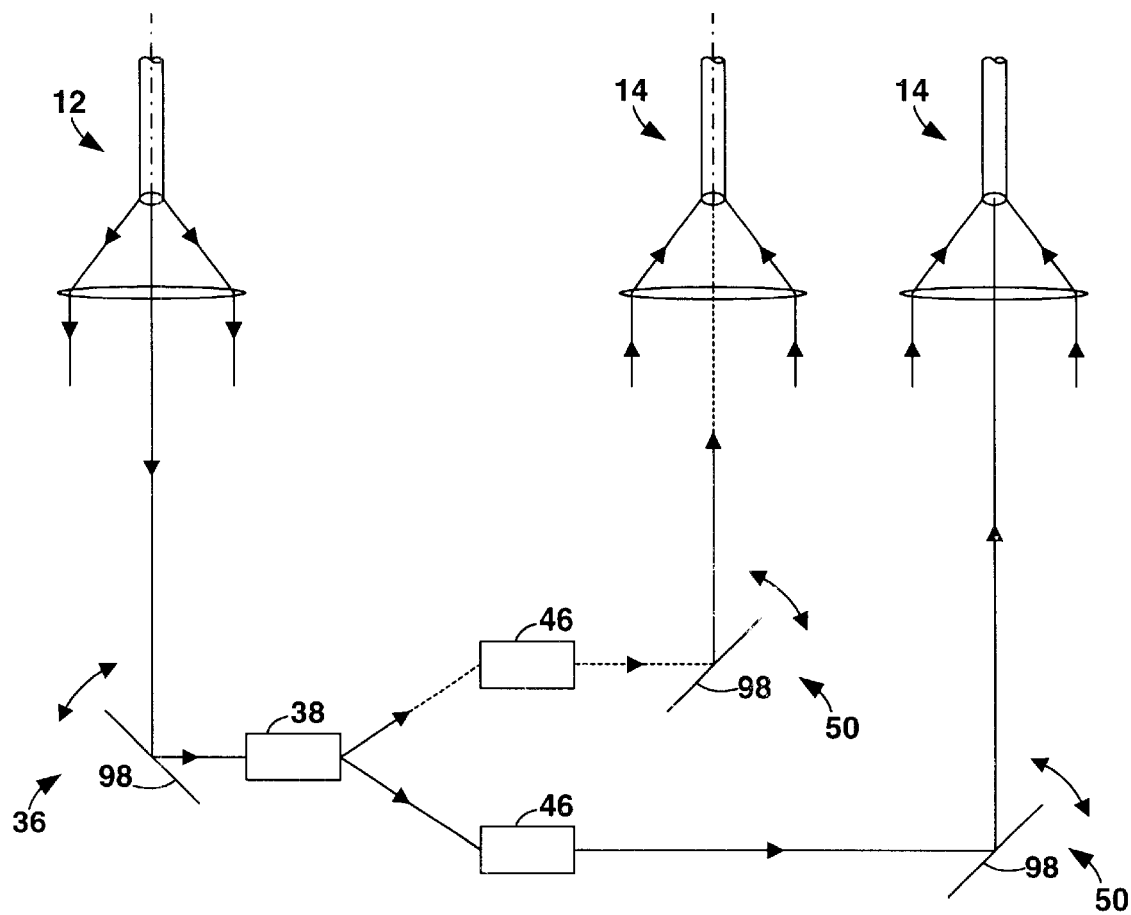
FIG. 6 shows the use of a tilting mirror for producing a small initial deflection.

In the third embodiment, all components, except for the initial deflector 36 and the beam aligner 50, are the same as those of the first embodiment. In the third embodiment, shown in FIG. 6, the small deflection angle change is produced by a separate tilting mirror 94. The mirror 94 is controlled by an actuator, such as the piezoelectric actuator described with reference to the first embodiment, which is in turn controlled by electric signals. The small amount of tilt of the mirror 94 produces an initial deflection of the light beam by a small angle value, after which the deflection angle is multiplied by the beam deflection amplifier 38.

4. The Fourth Module Embodiment

In the fourth embodiment, the initial beam deflector 36 is another electrically-controlled beam deflector. Such beam deflectors include, but are not limited to, acousto-optical light beam deflectors, surface acousto-optical wave (SAW) deflectors, electro-optical light beam deflectors, electrically-controlled light grating deflectors, liquid crystal light beam deflectors, light grating valve devices, etc. These light beam deflectors are advantageous in many cases because they have no mechanical moving parts. Usually the small deflection angles that these light beam deflection techniques can provide severely limited the application of these fully electronically controlled light beam deflectors. The present invention, however, provides a way to use all of these deflection techniques for optical switching applications.

The use of microelectromechanical (MEM) devices to produce an initial small angle change followed by a deflection angle amplification is also contemplated by the present invention. MEM devices are used in the prior art for optical switching See, Lin et al., supra. However, the use of MEM devices, including the use of MEM mirror devices, in the prior art are essentially different than that in the present invention. There are two essential differences between the use of MEM devices in the prior art and the use in the present invention. In the prior art, MEM devices are used as an on/off device. That is, the MEM device is used to only transmit a light beam from a fixed optical fiber to another fixed optical fiber. Id. In the present invention, however, MEM devices are used as a quantitatively and dynamically controlled beam direction deflector. Each MEM cell element is responsible for transmitting the light beam from one fixed source optical fiber to a number of destination optical fibers, one at a time. The deflection angle value determines where the light beam is to be transmitted from the source optical fiber, hence to which specific destination optical fiber the source optic fiber is to be cross-connected. This means that, in order to connect a single fiber to one of a group of N fibers, only a single MEM device is needed. Consequently, in order to cross-connect a group of N source optical fibers with a group of N destination optical fibers, only 2N MEM devices are needed, rather than the N2 MEM devices needed in the prior art.

In the second difference from the prior art, MEM devices are used for directly transmitting the light beam to the destination optical fiber. In the present invention, MEM devices are used only for providing an initial deflection angle, and must be used jointly with a deflection amplification lens system.

B. The Optical Switching System

The above-described optical switch cell is the basic building block for construction of a large optical switching system.

The switching systems of the present invention ensures that the optical switching is essentially wavelength independent and without polarization distortion. It is capable of operating with all wavelengths used in optical communications, including single mode and multimode systems. This is particularly important when the system implements Dense Wavelength Multiplexing and Demultiplexing techniques.

1. The First Switching System Configuration

Figure 7:
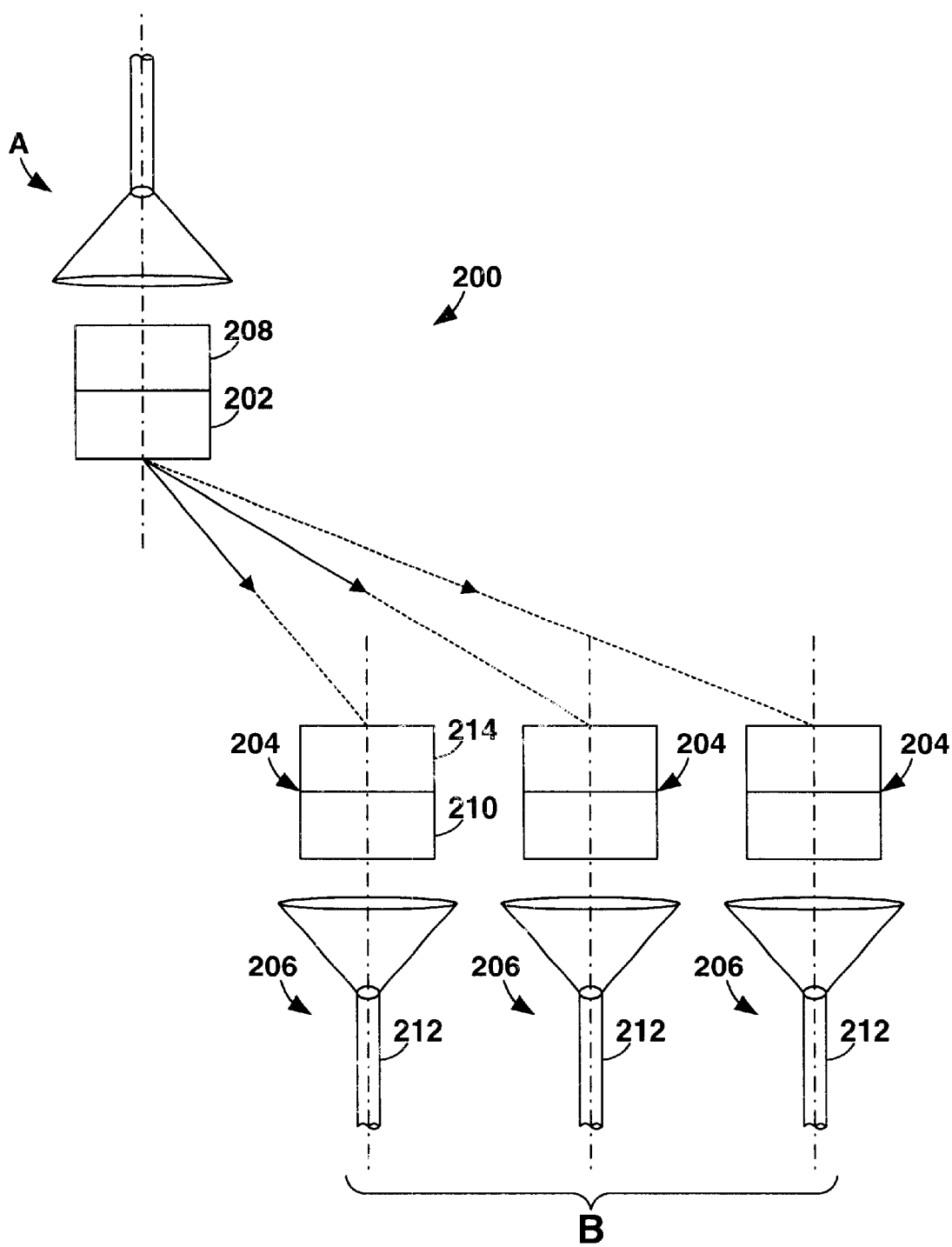
FIG. 7 shows the first switching system configuration.

First system configuration 200 connects a single channel to a number of channels. As shown in FIG. 7, the light from single channel A can be transmitted to one channel of group B in known physical relation to channel A. The system consists of a single switch cell acting as a transmitting element 202 and a number of switch cells equal to the number of group B channels 206 and acting as receiving elements 204. The group B channel 206 to which the source signal is directed is solely determined by the quantitative control of the deflection angle of the transmitting element 202. In order to switch the source signal to a group B channel 206, the electrical signal to the initial deflector 208 is changed to a value corresponding to the correct deflection angle and, simultaneously, the beam aligner 210 at the group B channel 206 is correspondingly and synchronously adjusted to align and receive the light beam. Since there is only one source channel in this simple embodiment, there is no real need for dynamic adjustment of the beam aligner 210 because the source signal can only come from one fixed direction.

Due to the fact that the figures are merely two-dimensional, the group B channels are only shown arranged in a single line. However, because the preferred transmitting element 202 and receiving element 204 can deflect a light beam in two dimensions, the present invention also contemplates that the group B channels 206 will be arranged two-dimensionally when looked at from the end of the fibers 212. This permits many more group B channels within the deflection range of the transmitting element 202. It is not necessary that the fibers 212 be arranged in a rectangle, but may be in a circle or other arrangement more practical to the particular application.

Note that, because all of the optical components of the system are bi-directional, as described above, the switch will operate in either direction. In other words, the group B channel to which channel A is switched can also act as a source channel transmitting a signal to channel A.

2. The Second Switching System Configuration

Figure 8:
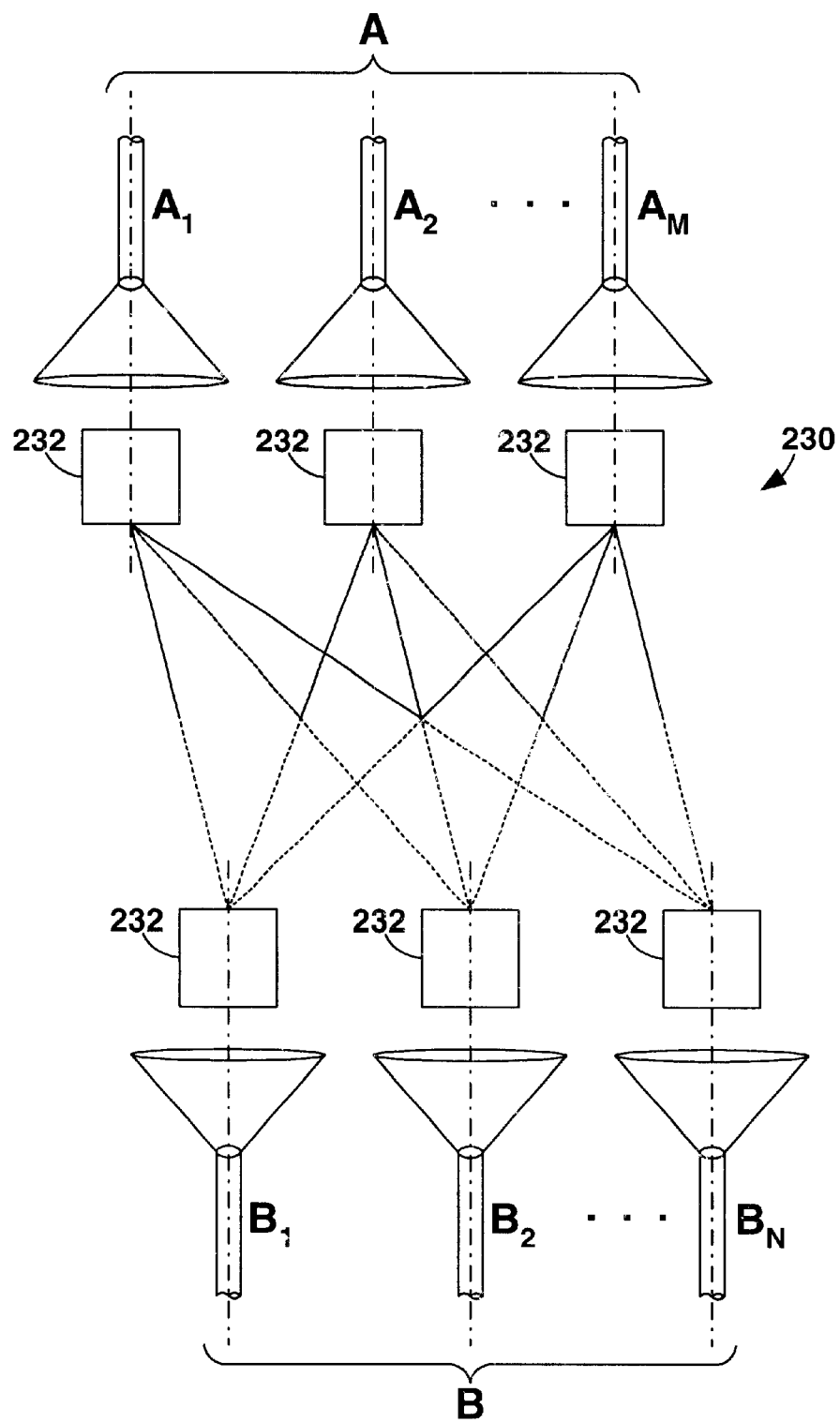
FIG. 8 shows the second switching system configuration.

The second switching system configuration 230, shown in FIG. 8, connects a group of M channels (group A) with another group (group B) of N channels. As indicated above, signals can travel in both directions. Also, as indicated above with reference to the first system configuration, the optical fibers of each group may be arrange two-dimensionally.

This second configuration illustrates one of the main advantages of the present invention over the switching systems of the prior art: to cross-connect a group of M channels to a group of N channels, only M+N switch cells 232 are needed, whereas, in prior art systems, M×N switches are needed. Assuming that M=N, the present invention requires only 2N switch cells 232 as opposed to $N^2$ switches of the prior art.

Note that as N increases, the difference becomes significant, increasing nearly exponentially. For example, in large fiber optic networks, it is quite common that the number of channels N to be cross-connected is greater than 1,000. The difference between the number of switch cells 2N=2,000 and the number of prior art switches N²=1,000,000 can be a critical factor in determining the feasibility of an optical switching system.

3. The Third Switching System Configuration

Figure 9:
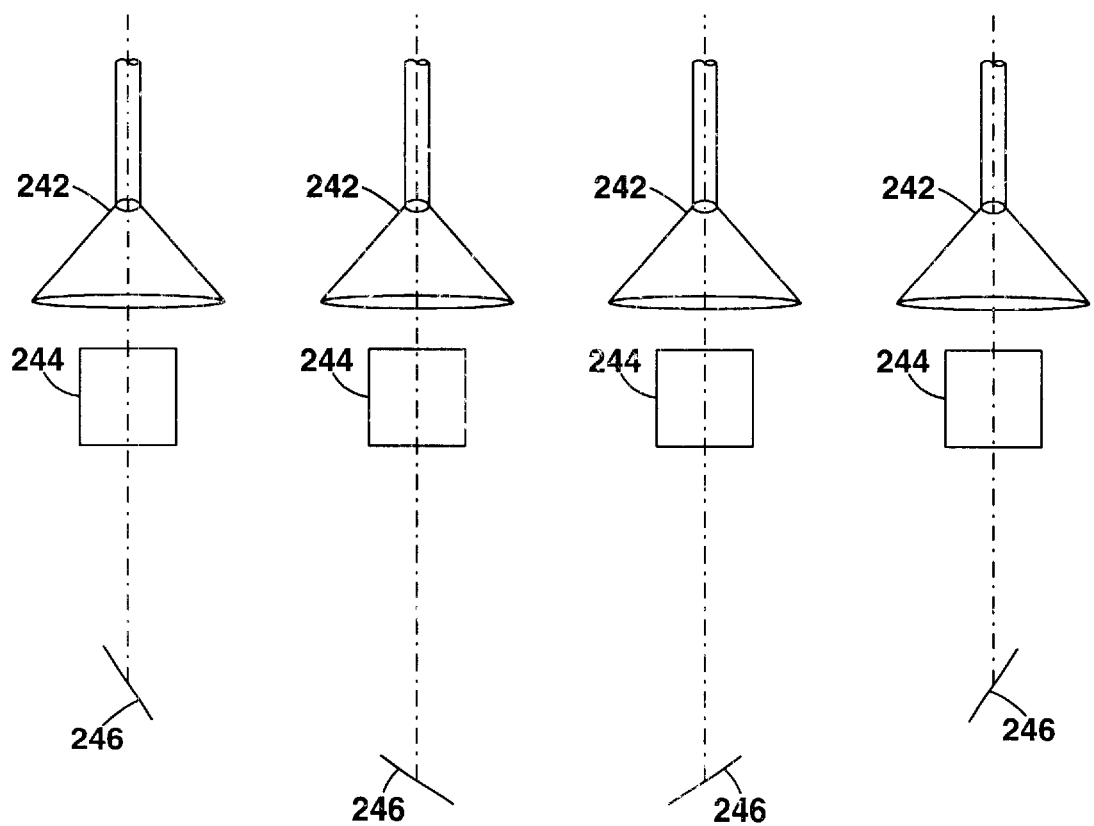
FIG. 9 shows the third switching system configuration.

The third switching system configuration 240, shown in FIG. 9, can cross-connect N channels in an arbitrary manner. When the channels 242 are positioned with a symmetric geometry, as shown in FIG. 9, each channel 242 can transmit and/or receive a signal from any other channel 242 through a pair of single switch cells 244 and a mirror 246. All mirrors 246 are fixed relative to the other system components. The orientation of each mirror 246 is adjusted to a specific orientation so that when no switching signals are applied to any of the channels 242, each channel 242 is statically connected to one and only one other channel 242. Thus, even with no switching signals present, all channels 242 are mutually connected without blocking communication. Assuming a system of four channels, A, B, C, and D, when in the static state, A is connected to B (A-B) and C is connected to D (C-D). When a new connection state is desired, for example, A-C and B-D, a set of electrical signals are applied simultaneously to A, B, C, and D so the output light beam from A is transmitted to and received by C, and the light beam from B is transmitted to and received by D. The reconfiguration and reorganization of the connection among the N channels can be full or partial.

In many fiber optic communication applications, such a fully-symmetric, internal, mutual cross-connection capability is highly desirable. With a system configuration of N channels, such cross-connection is achievable using N switch cells. Note that switching systems of the prior art have no such cross-connection capability when the number of fibers is greater than some small number.

4. Fabrication Techniques

The following is a description of device fabrication techniques. There are three methods for fabrication of the switch cells and the switching system. The first approach is to use conventional optical and machining methods. According to this approach, the lenses are made with conventional optical engineering techniques and the actuators, for example, the piezoelectric actuators, are made using conventional machining methods. When the number of channels is small, such established methods and commercially off-the-shelf components can provide a quick solution.

The second approach is to use micromachining, microfabrication, and integrated optic methods. According to this approach, for example, the SAW (Surface Wave Acousto optical) initial deflector can be made with integrated optics methods as single devices or device arrays. The piezoelectric actuators can be made through laser machining, EDM (Electric Discharging Machining), or other micromachining methods as single devices or device arrays. The lens systems can be made through micromachining methods as microlens arrays.

The third approach is a hybrid approach. The question of which fabrication process approach is the best is, to large extent, determined by the specific performance requirements of the optical switches. Optical networks require a great variety of optical switches that can only be met by different approaches.

Thus it has been shown and described an optical switch and systems comprised thereof which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An optical switching module for switching a source light beam from a source optical channel to a destination optical channel with known position, said switching module comprising:

(a) a transmitting element including an initial beam deflector and a beam deflection amplifier; and (b) a receiving element including a beam deflection compressor and a beam aligner;

(c) said initial beam deflector receiving said source light beam and emitting an initially deflected light beam at an initial deflection angle $\alpha$;

(d) said beam deflection amplifier having a deflection angle transfer function F>1, and receiving said initially deflected light beam and transmitting a fully deflected light beam at a full deflection angle $F\alpha$;

(e) said beam deflection compressor having a deflection angle transfer function $-1<G<1$, and receiving said fully deflected light beam and transmitting a coarsely aligned beam at a deflection angle $GF\alpha$; and (f) said beam aligner receiving said coarsely aligned beam and emitting a beam aligned with said destination channel.

2. The optical switching module of claim 1 wherein said switching module is bidirectional.

3. The optical switching module of claim 1 wherein said receiving element is the same as said transmitting element operating in reverse.

4. The optical switching module of claim 1 wherein said transmitting element and said receiving element are piezoelectric light deflectors.

5. An optical switching system for switching source light beams from at least one source optical channel to one of a plurality of destination optical channels, each of said destination channels having known positions relative to said at least one source channel, said switching system comprising:

(a) a transmitting element for each of said at least one source channel, said transmitting element including an initial beam deflector and a beam deflection amplifier; and (b) a receiving element for each of said destination channels, said receiving element including a beam deflection compressor and a beam aligner;

(c) said initial beam deflector receiving said source light beam and emitting an initially deflected light beam at an initial deflection angle $\alpha$;

(d) said beam deflection amplifier having a deflection angle transfer function F>1, and receiving said initially deflected light beam and transmitting a fully deflected light beam at a full deflection angle $F\alpha$, said function F including at least values corresponding to said known positions of said destination channels;

(e) said beam deflection compressor having a deflection angle transfer function $-1<G<1$, and receiving said fully deflected light beam and transmitting a coarsely aligned beam at a deflection angle GFα; and (f) said beam aligner receiving said coarsely aligned beam and emitting a beam aligned with said destination channel.

6. The optical switching system of claim 5 wherein said transmitting element and said receiving elements are bidirectional.

7. The optical switching system of claim 5 wherein said receiving elements are the same as said transmitting element operating in reverse.

8. The optical switching system of claim 5 wherein said transmitting element and said receiving elements are piezoelectric light deflectors.

* * * * *